(12) United States Patent
Ratts et al.

(10) Patent No.: US 11,549,418 B1
(45) Date of Patent: Jan. 10, 2023

(54) DESULFATION OF AFTERTREATMENT COMPONENT

(71) Applicant: Caterpillar Inc., Peoria, IL (US)

(72) Inventors: Joshua L. Ratts, East Peoria, IL (US); Julia H. Jenks, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/556,533

(22) Filed: Dec. 20, 2021

(51) Int. Cl.
*F01N 3/20* (2006.01)

(52) U.S. Cl.
CPC ........ *F01N 3/2066* (2013.01); *F01N 2900/08* (2013.01); *F01N 2900/1404* (2013.01); *F01N 2900/1411* (2013.01); *F01N 2900/1602* (2013.01)

(58) Field of Classification Search
CPC combination set(s) only.
See application file for complete search history.

(56) References Cited

U.S. PATENT DOCUMENTS

| | | | |
|---|---|---|---|
| 7,481,046 B2 | 1/2009 | Goralski, Jr. et al. | |
| 2011/0185708 A1* | 8/2011 | McCarthy, Jr. | F01N 3/0842 60/299 |
| 2012/0102930 A1 | 5/2012 | Park | |
| 2014/0331752 A1* | 11/2014 | Hall | F02D 41/146 73/114.75 |
| 2019/0203622 A1* | 7/2019 | Haruguchi | F02D 41/068 |
| 2019/0291887 A1* | 9/2019 | Surawski | B64D 37/32 |
| 2020/0224572 A1* | 7/2020 | Linzen | F01N 3/035 |
| 2020/0263594 A1* | 8/2020 | Muto | F01N 11/007 |

FOREIGN PATENT DOCUMENTS

| | | | | |
|---|---|---|---|---|
| EP | 1270908 A2 * | 1/2003 | | F01N 3/0842 |
| EP | 1161618 B1 | 5/2003 | | |
| EP | 1086741 B1 | 4/2006 | | |
| EP | 2868885 A1 * | 5/2015 | | B01D 53/9495 |
| FR | 2825412 A1 | 12/2002 | | |
| FR | 2856733 A1 | 12/2004 | | |
| WO | WO-2008155638 A2 * | 12/2008 | | F01N 13/009 |

* cited by examiner

*Primary Examiner* — Binh Q Tran
(74) *Attorney, Agent, or Firm* — Leydig, Voit & Mayer, Ltd (57) ABSTRACT

A computer-implemented system for monitoring the performance of an aftertreatment component in an exhaust system of a power generation system utilizes a remaining useful life (RUL) algorithm to predict its remaining operational life until it must be regenerated by a desulfation process. The RUL algorithm can utilize values such as a current sulfur accumulation value representing the quantity of sulfur currently accumulated in the aftertreatment component, a sulfur accumulation threshold representing the quantity sulfur the aftertreatment component can operationally retain, and an instantaneous sulfur accumulation rate of change representing the current rate at which the aftertreatment component retains sulfur.

20 Claims, 3 Drawing Sheets

DESULFATION OF AFTERTREATMENT COMPONENT

TECHNICAL FIELD

This patent disclosure relates generally to aftertreatment systems and methods for converting emissions in exhaust gasses and, more particularly, to desulfation of an aftertreatment component to remove sulfur-containing compounds therein.

BACKGROUND

Power plants such as internal combustion engines and gas turbines combust hydrocarbon based fuels and to convert the latent chemical energy therein to mechanical power that can be utilized for other work. Exhaust gasses are the byproduct of the combustion process and include various different chemical constituents that may be detrimental to the environment. Therefore, various methods and systems have been developed to purify or modify the composition of the exhaust gasses before discharge to the environment. Aftertreatment systems and methods refer to a field of emission control and modification technologies and are named because these technologies interact with the exhaust gasses after formation during combustion and discharge from the engine or turbine.

One particular aftertreatment system is selective catalytic reduction (SCR), in which nitrogen oxides ($NO_x$) in the exhaust gasses are chemically reduce to nitrogen ($N_2$) and water ($H_2O$) in the presence of a catalyst and an additive or reductant such as urea or diesel exhaust fluid (DEF) that typically contains ammonia ($NH_3$) or a similar substance. The SCR catalyst is a physical element often made from or containing metals that facilitate the chemical reaction and that is structurally configured as a series of baffles, a honeycomb, or a mesh so the exhaust gasses and reductant added upstream can flow or pass there through. The material of the SCR catalyst, however, may be contaminated by other chemical constituents of the exhaust gasses. In particular, sulfur-containing chemicals like sulfates may deposit on the surfaces of the SCR catalyst over time leading to a degradation in the reduction of nitrogen oxides.

Accordingly, the SCR catalyst may be periodically regenerated by a process referred to a desulfation to remove the sulfur and sulfur-containing compounds from the catalytic surfaces. Various desulfation processes have been developed such as operating the engine or power plant under rich air-fuel ratios to increase the hydrocarbon content of the exhaust gasses as described in U.S. Publication 2006/0140819 and/or operating the SCR catalyst at an elevated temperature, e.g., in excess of 500° C., such as described in U.S. Publication 2016/0108791. However, because operation under the desulfation conditions may adversely affect the output performance of the engine or power plant or detrimentally affect the components of the aftertreatment system, it is desirable the desulfation processes are only run periodically. The present application is directed to a system and method to assist in assessing when desulfation should be conducted.

SUMMARY

The disclosure describes, in one aspect, a power generation system having an internal combustion engine in fluid communication with the exhaust conduit of the an exhaust system for direct exhaust gasses to the ambient environment. To convert chemical constituents in the exhaust gasses to more benign compounds before discharge to the environment, an aftertreatment system is operatively associated with the exhaust system and includes at least one aftertreatment component fluidly disposed in the exhaust conduit to receive the exhaust gasses. A plurality of sensors are used to monitor one or more operating characteristics of the internal combustion engine, the exhaust system, and/or the aftertreatment system. Further, an electronic controller can communicate with the plurality of sensors and is programmed to execute a remaining useful life algorithm to predict a Remaining Useful Life (RUL) of the aftertreatment component. The RUL algorithm is based in part by determining an Instantaneous Sulfur Accumulation Rate of Change from the one or more operating characteristics.

In another aspect, the disclosure describes a method of monitoring performance of an aftertreatment component associated with an exhaust system. The method involves determining a Current Sulfur Accumulation Value of sulfur-containing compounds in the aftertreatment component and subtracting the Current Sulfur Accumulation Value from a Sulfur Accumulation Threshold Value associated with the aftertreatment component to calculate a Residual Sulfur Capacity of the aftertreatment component. The method thereafter predicates are Remaining Useful Life (RUL) associated with the aftertreatment component by dividing the Residual Sulfur Capacity by an Instantaneous Sulfur Accumulation Rate of Change representing the present rate sulfur-containing compounds are retained in the aftertreatment component.

In yet another aspect, the disclosure describes a computer readable medium programmed to monitor performance of an aftertreatment system. The computer readable medium includes instructions for determining a Current Sulfur Accumulation Value representing a current quantity of sulfur-containing compounds accumulated in the after treatment component, calculating a Residual Sulfur Capacity of the aftertreatment component by subtracting the Current Sulfur Accumulation Value from a Sulfur Accumulation Threshold Value associated with the aftertreatment component, and predicting a Remaining Useful Life (RUL) of the after treatment component by dividing the Residual Sulfur Capacity by an Instantaneous Sulfur Accumulation Rate of Change representing a present rate at which sulfur-containing compounds are accumulating in the aftertreatment component.

DETAILED DESCRIPTION

Figure 1:
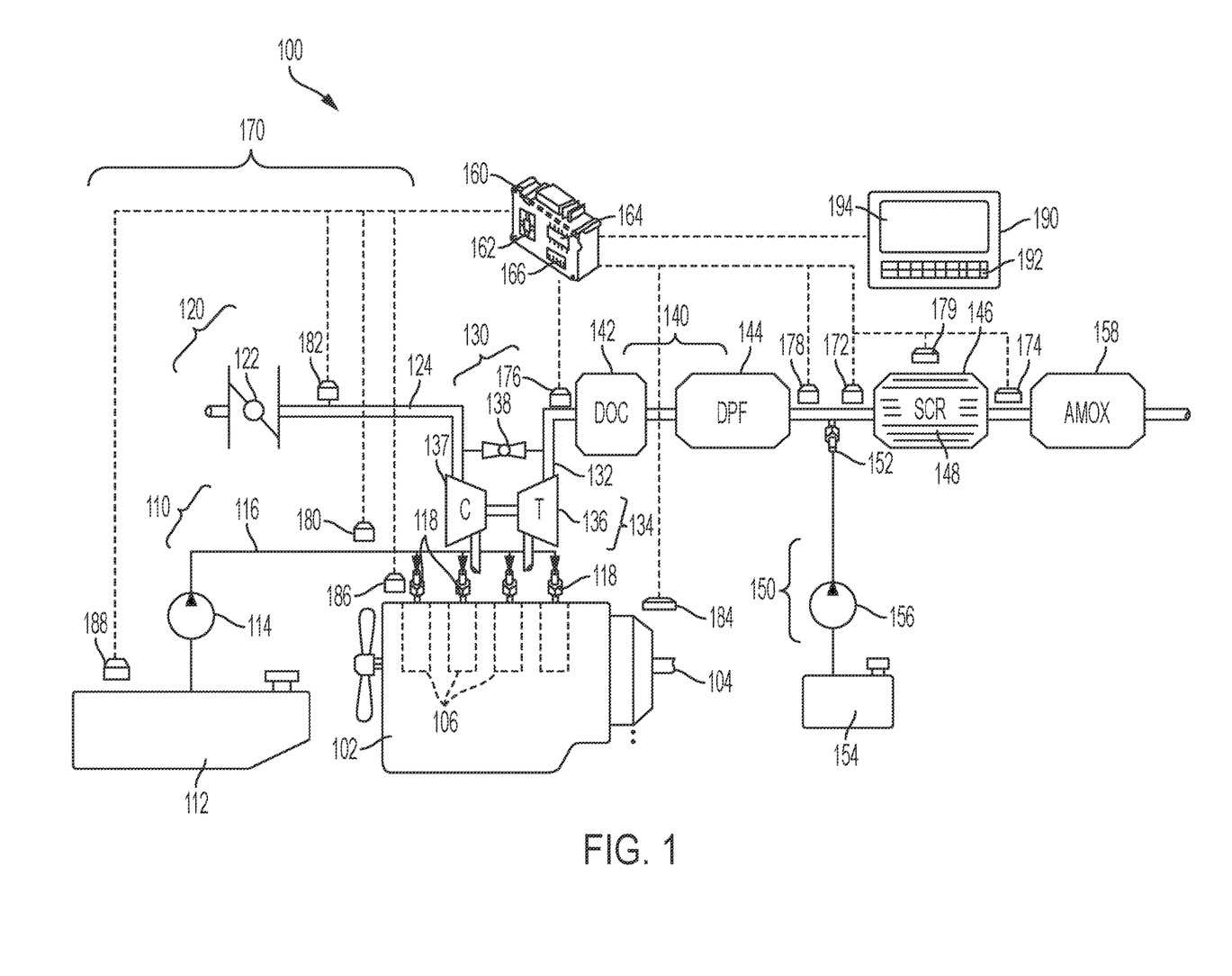
FIG. 1 is a schematic block diagram of an internal combustion engine and related systems that are fluidly communicating with an aftertreatment system for chemically modifying exhaust gasses in accordance with the disclosure.

Now referring to the drawings, wherein whenever possible like reference numbers will refer to like elements, there is illustrated a power generation system 100 for the combustion of a hydrocarbon based fuel to convert the chemical energy therein to mechanical power, particularly, rotation or torque. The power generation system 100 can include a prime mover such as an internal combustion engine 102 inside of which combustion of an air-fuel mixture occurs to convert energy to torque that is transferred via a rotating driveshaft 104 protruding from the engine block. Disposed in the engine block of the engine 102 are a plurality of combustion chambers 106 or cylinders in which are disposed reciprocating pistons that are operatively coupled to a crankshaft associated with the driveshaft 104. Forcible reciprocation of the pistons by combustion of air and fuel in the combustion chambers 106 thereby rotates the driveshaft 104 that is operatively coupled to another device(s) driven by the internal combustion engine 102. In another embodiment, the prime mover may be a gas turbine which combusts natural gas to spin turbine blades fixed to a turbine shaft such that the turbine shaft rotates and transmits torque to the driven device.

In an example, the driven device may be an electrical generator having a rotor with magnetic or electromagnetic components that is rotatably disposed in an annular stator having a plurality of conductive coils or windings. Rotation of the rotor inside the annular stator results in electromagnetic interaction between the magnetic components of the rotor and the conductive windings of the annular stator to induce an electrical voltage and direct electrical current to an external load via an electrically conductive circuit. In the present example, the power generation system 100 may be part of a larger system referred to as a genset and may be disposed to provide an external or backup source of electrical power to a facility such as a hospital or data center. The power generation system 100 can also be associated with a mobile or stationary machine and the power generated by the internal combustion engine 102 can be utilized for mobility via a plurality of propulsion devices such as wheels, tracks or propellers, or may be utilized to operate pumps or fans. Regardless of the application, the present disclosure is particularly applicable to large power generation systems 100 that may be capable of generating hundreds of watts of power.

To supply a hydrocarbon-based fuel such as gasoline or diesel to the internal combustion engine 102, the power generation system 100 can include a fuel system 110. To accommodate a liquid fuel, the fuel system 110 can include a fuel tank 112 or reservoir defining a volume for retention of fuel. To direct fuel from the fuel tank 112 to the internal combustion engine 102, the fuel system 110 can include a fuel pump 114 configured to pressurize and direct liquid fuel through one or more fuel conduits 116 such as hoses or tubes in fluid communication with the fuel pump. The fuel pump 114 may be fluidly connected to a plurality of fuel injectors 118 each associated with one of the combustion chambers 106 to introduce fuel into the internal combustion engine 102.

To provide air to function as an oxidizer during the combustion process, the power generation system 100 can include an air intake system 120 that draws air from the ambient environment and directs airflow to the internal combustion engine 102. In an embodiment, the air intake system 120 can include a throttling valve 122 that can be adjustably opened and closed to admit or throttle airflow to the intake conduits 124 fluidly leading to the internal combustion engine 102. In various embodiment, one or more air filters may be disposed in the intake conduits 124 to filter the intake air and the internal combustion engine 102 can include an intake manifold coupled to the air intake conduits 124 and arranged to distribute the intake airflow to the plurality of combustion chambers 106.

In the combustion chambers 106, the fuel and air directed thereto are combusted together resulting an explosive volumetric expansion of gasses within the combustion chamber that forcible drives the piston operatively connected to the driveshaft 104 that rotates in response to the combustion event. The resulting exhaust gasses may be expelled from the combustion chamber 106 by the reciprocally opposite movement of the piston to discharge the gasses from the internal combustion engine 102 to an exhaust system 130. The exhaust system 130 can include an exhaust conduit 132 or tailpipe to fluidly convey the exhaust gasses to the ambient environment.

In an embodiment, to increase the influx of intake air to the combustion chambers 106, the internal combustion engine 102 may be associated with a turbocharger 134. The turbocharger 134 leverages the pressurized exhaust gasses flowing in the exhaust conduit 132 to pressurize the intake air flowing in the intake conduit 124, thereby increasing the amount of air and proportionally the fuel that can be directed into the combustion chamber 106. The turbocharger 134 can include a turbine 136 fluidly disposed in the exhaust conduit 132 that has a plurality of vanes fixed to a rotating shaft. The rotating shaft extends from the turbine 136 and is coupled to a compressor 137 disposed in the intake conduits 124 and that also includes plurality of vanes that are rotatable with respect to the intake conduit. Pressurized exhaust gasses forcibly rotates the turbine 136 rotating the compressor 137 to pressurize the intake airflow to the engine 102.

In an embodiment, to reduce the formation of $NO_x$ during combustion, the internal combustion engine may be associated with an exhaust gas recirculation system (EGR) including an EGR valve 138 fluidly arranged between the exhaust system 130 and the intake system 120 to redirect a portion of the exhaust gasses from the exhaust conduit 132 to the intake conduit 124. The presence of exhaust gasses in the intake air during certain operating conditions of the internal combustion engine may suppress the formation of $NO_x$ within the combustion chambers 106.

To further reduce $NO_x$ and other chemical constituents of the exhaust gasses, the exhaust system 130 can be operatively associated with an aftertreatment system 140 including one or more aftertreatment components that are fluidly coupled with the internal combustion engine 102 by the exhaust conduit 132. For example, to reduce carbon monoxides (CO) and hydrocarbons (CxHx) resulting from unburned fuel in the exhaust gasses, a diesel oxidation catalyst (DOC) 142 can be included to initiate an oxidation reaction converting those components to carbon dioxide ($CO_2$) and water ($H_2O$). The DOC 142 may include a pass-through or flow through substrate such as baffles, a honeycomb, or a mesh coated with noble metals that catalyze the reaction. A second reaction associated with DOCs is the production of nitrogen dioxide ($NO_2$) from nitrogen oxide (NO) and oxygen ($O_2$) in the exhaust gases that requires further treatment.

To remove particulate matter and soot in the exhaust gasses, the aftertreatment system 140 can include a diesel particulate filter (DPF) 144 downstream of the DOC 142 and that may have a substrate of cordierite, aluminum, or a similar ceramic material to trap and retain the particulate matter. Because the DPF 144 traps and removes matter from the exhaust gasses rather chemically converts the matter into other constituents that pass on with the exhaust gasses, the DPF must be periodically regenerated to prevent clogging of the exhaust system 130. One known method to regenerate a DPF is to increase the enthalpy or heat energy directed to the DPF and burn the retained particulate matter and soot therein.

To reduce and further abate the presence of $NO_x$ in the exhaust gasses, the aftertreatment system can include an SCR catalyst 146 disposed downstream of the DPF to receive the exhaust gasses. The SCR catalyst 146 can include an internal SCR catalytic substrate 148 that includes or is coated with a catalytic material to facilitate the SCR reaction in which nitrogen oxides $NO_x$ are converted in the presence of a reductant to nitrogen ($N_2$) and water ($H_2O$). Examples of suitable materials for the SCR catalytic substrate 148 include copper zeolite, iron zeolite, tungsten, vanadium and the like. To receive and direct the exhaust gasses through the SCR catalyst 146, the SCR catalytic substrate 148 may be physically configured with a flow through configuration such as baffles, a honeycomb or a mesh. In an embodiment, the SCR catalyst 146 may be a three-way catalyst that is also configured to convert other constituents like hydrocarbons.

To provide reductant such as urea or DEF for the SCR reaction, a reductant delivery system 150 can be associated with the aftertreatment system 140 and can include a reductant injector 152 disposed in the exhaust conduit 132 upstream of the SCR catalyst 146. The reductant injector 152 can be an electromechanical device similar to a fuel injector that can be rapidly opened and closed to introduce pressurized reductant fluid into the exhaust conduit 132 to mix with the exhaust gasses entering the SCR catalyst 146. To accommodate the liquid reductant, the reductant delivery system 150 can include a refillable reductant tank 154 or reservoir. To pressurize the liquid reductant for injection, the reductant delivery system 150 can include a reductant pump 156 disposed between and in fluid communication with the reductant injector 152 and the reductant tank 154.

In some situations, excess urea or DEF, which typically contains ammonia, may be introduced to the SCR catalyst 146 by the reductant delivery system 150 resulting some ammonia being discharged from the SCR catalyst 146 with the reduced exhaust gasses, known as ammonia slip. To prevent the excess ammonia from being discharged to the atmosphere, the aftertreatment system 140 may include an ammonia oxidation catalyst ($AMO_x$) 158 downstream of and in fluid communication with the SCR catalyst 146. The $AMO_x$ catalyst is made from materials able to catalyze ammonia ($NH_3$) and oxygen ($O_2$) to nitrogen ($N_2$) and water ($H_2O$). The foregoing description of the aftertreatment system 140 is exemplary only and the aftertreatment system may include additional or fewer aftertreatment components in different orders and arrangements. For example, the aftertreatment system 140 may include a nitrogen oxide ($NO_x$) adsorbent trap that traps and retains $NO_x$ from the exhaust gases.

To monitor and regulate the aftertreatment process, the aftertreatment system 140 can be operatively associated with an computing device such as an electronic control unit (ECU), electronic control module (ECM), or, as referred to herein, an electronic controller 160. The electronic controller 160 can be a programmable computing device and can include one or more microprocessors 162, non-transitory computer readable and/or writeable memory 164 or a similar storage medium, input/output interfaces 166, and other appropriate circuitry for processing computer executable instructions, programs, applications, and data. The microprocessor 162 of the electronic controller 160 may be configured to process digital data in the form of binary bits and bytes and can have any suitable configuration such as an application specific integrated circuit (ASIC), a field programmable gate array (FPGA), or a similar configuration. In addition to regulating the aftertreatment system 140, the electronic controller 160 may be responsible for monitoring and regulating operation of the other systems and devices associated with the power generation system 100. Although illustrated as a unitary device, the electronic controller 160 and its functionality may be distributed among a plurality of computing devices.

With respect to monitoring the aftertreatment system, the electronic controller 160 can be operatively associated with a communication network 170 including plurality of sensors, controls, and/or actuators that measures or senses operation of the power generation system 100 including the internal combustion engine 102. The plurality of sensors may be able to output measurements of various parameters in the form of electrical data signals representing the measured parameter of consideration that the communication network 170 communicates to the electronic controller 160 for processing. The electrical signals may be analog signals represented by the relative strength of current or voltage or may be digital signals represented as a sequence of discrete binary values.

For example, the plurality of sensors may include a catalyst-in sensor 172 disposed upstream of the SCR catalyst 146 and a catalyst-out sensor 174 disposed downstream of the SCR catalyst 146. The catalyst-in sensor 172 and the catalyst-out sensor 174 therefore can provide information about the change in exhaust gasses passing through the SCR catalyst 146 and therefore information about the operation and effectiveness of the SCR catalyst. In an embodiment, the catalyst-in sensor 172 and the catalyst-out sensor 174 are constituent sensors that can measure the composition of the exhaust gasses flowing into and out of the SCR catalyst 146. For example, oxygen detection sensor are commonly used in the automotive industry for detecting the concentration of oxygen ($O_2$) in exhaust gasses. The measurement of $O_2$ in the exhaust gasses combined with other measurements can be processed to determine the concentration of other substances in the exhaust gasses. Alternatively, the catalyst-in and catalyst-out sensor 172, 174 can measure the concentration of other constituents in the exhaust gasses like nitrogen oxides $NO_x$, carbon dioxides $CO_2$. In an embodiment, the catalyst-in and catalyst-out sensors 172, 174 can directly measure the concentration of sulfur-containing compounds in the exhaust gasses and can provide direct measurement of the sulfur accumulated in the SCR catalyst 146.

Additional sensors may be disposed to measure characteristics of the exhaust gasses flowing in the exhaust system 130. For example, an engine-out sensor 176 may be disposed in the exhaust system 130 directly downstream of the internal combustion engine 102 to receive and measure characteristics of the exhaust gasses directly discharge from the combustion chambers 106 prior to any treatment by the aftertreatment system 140. The engine out sensor 178 can be a constituent sensor configured measure and generate an electrical signal indicative of the presence or quantity of a particular chemical constituent of the exhaust gases, for example, $NO_x$ or sulfur content. The engine out sensor 178 can therefore provide a signal indicative of the composition of the exhaust gasses prior to any treatment by the aftertreatment system 140. To measure the flowrate and/or temperature, an exhaust flowrate/temperature sensor may be disposed upstream of the SCR catalyst 146 to measure the flowrate and temperature of exhaust gasses entering the SCR catalyst which may affect operation of the SCR catalyst. Because temperature does affect operation of the SCR reduction process, in an embodiment a catalyst temperature sensor 179 can be disposed on or in the SCR catalyst 146 to directly measure temperature associated with SCR process.

To determine the amount of fuel introduced to the internal combustion engine 102, a fuel flowrate sensor 180 can be disposed in the fuel conduits 116 directing fuel between the fuel tank 112 and the plurality of injectors 118. Similarly, to measure the amount of intake air ingested by the air intake system 120, an airflow sensor 182 can be disposed in the air intake conduit 124. The fuel flowrate sensor 180 and the airflow sensor 182 can be mass flow sensor or volume flow sensors and can utilize any suitable sensing technology such as pressure transducers, piezoelectrical techniques, rotary impellers, and in the case of the airflow sensor 182, thermal wire techniques. In the case of the fuel flowrate sensors 180, instead of a single sensor disposed in the fuel conduit 116, each of the plurality of fuel injector 118 may be configured to sense and communicate data regarding the fuel quantity or rate.

To determine operating conditions associated with the internal combustion engine 102 such as the operating speed of the internal combustion engine 102, the communication network 170 can be operatively associated with an engine speed sensor 184 that measures, for example, the output speed of the driveshaft 104 in RPM. Examples of suitable engine speed sensors include Hall Effect sensor that directly measure the changes in strength of a magnetic field associated with a magnet disposed on and spinning with the driveshaft 104. To measure parameters associated with the combustion process occurring in the engine 102, a manifold pressure sensor 186 can be disposed on the engine block. The manifold pressure sensor 186 can measure the pressure effects of combustion within the combustion chambers and can be analyzed to determine assorted information regarding the combustion process.

In an embodiment, the communication network 170 can also include a fuel composition sensor 188 that is disposed in the fuel tank 112 and is able to measure the sulfur content of the fuel or other characteristics associated with the fuel composition that may be directly or indirectly indicative of the combustibility of the fuel. Alternatively, information about the quality and composition of the fuel, including sulfur content, can be determined by selecting a particular grade of fuel when filling the fuel tank 112.

As indicated, the plurality of sensors may communicate with the electronic controller 160 by sending and receiving electronic data signals via the communication network 170. The communication network 170 can be embodied as a controller area network (CAN) as may be familiar to those of skill in the automotive technologies. The communication network 170 may utilize a standardized communication bus including physical communication channels such as conduct wire to convey data and information signal between the electronic controller 160 and the plurality of sensors. However, in possible embodiments, the communication network may utilize other forms of data communication such as radio frequency waves like Wi-Fi, optical wave guides and fiber optics, or other technologies.

In a possible embodiment, to interface with an operator of the power generation system 100, the electronic controller 160 can be associated with a human machine interface (HMI) 190. The HMI 190 can include different input devices and output devices (I/O) to interact with a human. Various input devices or hardware include keyboards 192, mice, dials and the like. Various output devices or hardware include visual display screens 194, speakers, and the like. Through the input and output devices associated with the HMI, the electronic controller 160 can provide perceptible information about operation of the aftertreatment system 140 and can receive instructions and commands for regulating that and other operations of the power generation system 100. The electronic controller 160 can be in electronic data communication with the HMI 190 via the communication network 170.

Particular constituents in the exhaust gasses, for example sulfates and sulfur-containing compounds, may degrade the performance of the various aftertreatment components of the aftertreatment system 140 over time. Sulfur-containing compounds include $SO_2$, $SO_3$, $H_2S$, and/or COS and are byproducts of the combustion process. With respect to the SCR catalyst 146, the sulfur-containing compounds may bind to and accumulate on the SCR catalytic substrate 148, which may be referred to as sulfur contamination or sulfur poisoning of the SCR catalyst. Sulfur accumulation may be problematic depending upon the material of the SCR catalytic substrate 148, particularly with respect to copper zeolite and iron zeolite materials. The accumulation of sulfur-containing compounds reduce the availability of the SCR catalytic material to conduct the SCR reaction and convert $NO_x$ to $N_2$ and $H_2O$.

Accordingly, it is periodically desirable to purge the SCR catalyst 146 of the accumulated sulfur by a desulfation process. Desulfation may be carried out in a variety of ways including, for example, heating the SCR catalytic substrate 148 to an elevated temperature, e.g., in excess of 500° C. for a period of time. Desulfation may also be carried out by altering the air-fuel ratio combusted in the internal combustion engine 102 or by a combination of altering the air-fuel ratio and temperature of the SCR catalytic substrate 148.

Various processes and strategies have been developed to determine if desulfation is desired by measuring or estimating the quantity or amount sulfur-containing compounds accumulated in the SCR catalyst 146. For example, the amount of sulfur accumulated may be directly measured by using the catalyst-in sensor 172 to measure the concentration of sulfur containing compound in the exhaust gasses entering the SCR catalyst 146 and the using the catalyst-out sensor 172 to measure the concentration of sulfur-containing compounds in the exhaust gasses exiting the SCR catalyst 146. This provides a direct measurement of the sulfur containing compounds and can be integrated over time to provide the amount of sulfur-containing compounds accumulated in the SCR catalyst 146.

The sulfur accumulation in the SCR catalyst may also be indirectly measured. For example, by measuring the quantities of another compound such as $NO_x$ entering and exiting the SCR catalyst 146 with the catalyst-in sensor 172 and the catalyst-out sensor 174, the effectiveness of the SCR catalyst 146 in reducing $NO_x$ can be determined. The effectiveness of the SCR catalyst 146 may be inversely related to the accumulation of sulfur-containing compounds therein. With information regarding the capacity of the SCR catalyst 146 and the quantity of the SCR catalytic substrate 148, the quantity of accumulated sulfur can be estimated based on the $NO_x$ reduction effectiveness of the SCR catalyst.

The sulfur accumulation in the SCR catalyst 146 may also be measured using virtual sensors that apply mathematical models to measured parameters associated with other aspects of the internal combustion engine 102 and associated systems. For example, the sulfur concentration of the hydrocarbon based fuel combusted in the internal combustion engine 102 may be determined by the fuel composition sensor 188 or from data associated with the grade of fuel used to fill the fuel tank 112. Information regarding the combustion process may be measured by the manifold pressure sensor 186, the engine speed sensor 184, and other sensors associated with the internal combustion engine 102. The sulfur concentration of the fuel and the combustion data can be processed to estimate the amount of sulfur-containing compounds generated by combustion and thus present in the exhaust gasses, and the electronic controller 160 can apply mathematical models to estimate the amount of sulfur retained and accumulating in the SCR catalyst 146, which is referred to as the sulfur accumulation value.

While determining the sulfur accumulation value of sulfur-containing compounds retained in the SCR catalyst 146 is useful, it may be desirable to provide a prognostic evaluation or estimation. Prognostics refers to the prediction of the amount time at which a device or component, like the SCR catalyst 146, will no longer perform its intended function at its intended effectiveness. Regarding the example of the SCR catalyst 146, the prognostic determination will predict the time at which the SCR catalyst is no longer able to convert $NO_x$ in the exhaust gasses at an effectiveness in compliance with environmental regulations. The result of the prognostic evaluation is the time remaining for the component to effectively function or operate, and may be termed the Remaining Useful Life (RUL).

In the context of a large power generation system 100 such as described in the present disclosure, the prognostic evaluation of the remaining useful life of an aftertreatment component may be particularly useful. Large power generation systems 100 may be only operated intermittently and may be operated over time several different operators. Therefore, historic information regarding the operation of the power generation system by including information regarding the sulfur and sulfur-containing compounds accumulated in the SCR catalyst 146 or other aftertreatment components may be communicated between operators. This may be advantageous if the power generation system 100 is made commercially available through a rental arrangement whereby temporary use to the power generation system is provided to another user by the owner. This may be the case where the power generation system 100 corresponds to electrical generators or gensets, which may be rented on a temporary basis for a specific timeframe and the current operator may not have historic knowledge about the previous operation of the generator.

Accordingly, an aspect of the disclosure provides a prognostic prediction or estimate of the remaining useful life (RUL) of an aftertreatment component of an aftertreatment system associated with a large power generation system 100. In an embodiment, the process or method for prognostic prediction of the remaining useful life can involve a calculation or algorithm that may be represented by variations of the following equation:

$$\text{Remaining Useful Life } (RUL) =$$
$$[\text{Sulfur Accumulation Threshold Value } -$$
$$\text{Current Sulfur Accumulation Value } (t)] \div$$
$$[\text{Instantaneous Sulfur Accumulation Rate of Change}]$$

wherein the Remaining Useful Life (RUL) represents the time remaining in which the aftertreatment component, for example, an SCR catalyst can effectively convert or reduce exhaust gasses within acceptable thresholds and can be measured in units of time such as hours;

wherein the Sulfur Accumulation Threshold Value may represent the predetermined amount or quantity of sulfur, sulfates and/or sulfur containing compounds that may be retained or accumulated in the aftertreatment component at which it no longer operates effectively or acceptably and may be represented in units of mass like grams or units of mass per volume like grams per liter;

wherein the Current Sulfur Accumulation Value (t) may represent the current or temporally instantaneous quantity or amount of sulfur, or sulfur-containing compounds in the aftertreatment component and may be represented in units of mass like grams or units of mass per volume like grams per liter; and wherein the Instantaneous Sulfur Accumulation Rate of Change may represent the current or temporally present rate that sulfur and/or sulfur-containing compounds are retained in the aftertreatment component and can be represented by units of mass per volume per time such as grams/liter/hours.

In accordance with an aspect of the disclosure, the Remaining Useful Life (RUL) algorithm may be calculated by the electronic controller 160 using data and information gathered from the plurality of sensors and communicated through the communications network 170. The electronic controller 160 may be programmed to conduct or execute a process, routine, or module represented by computer executable instructions written in a software programming language. To facilitate understanding of the Remaining Useful Life (RUL) algorithm, the process performed by the electronic controller 160 may be represented by the flow diagram illustrated in FIG. 2.

Figure 2:
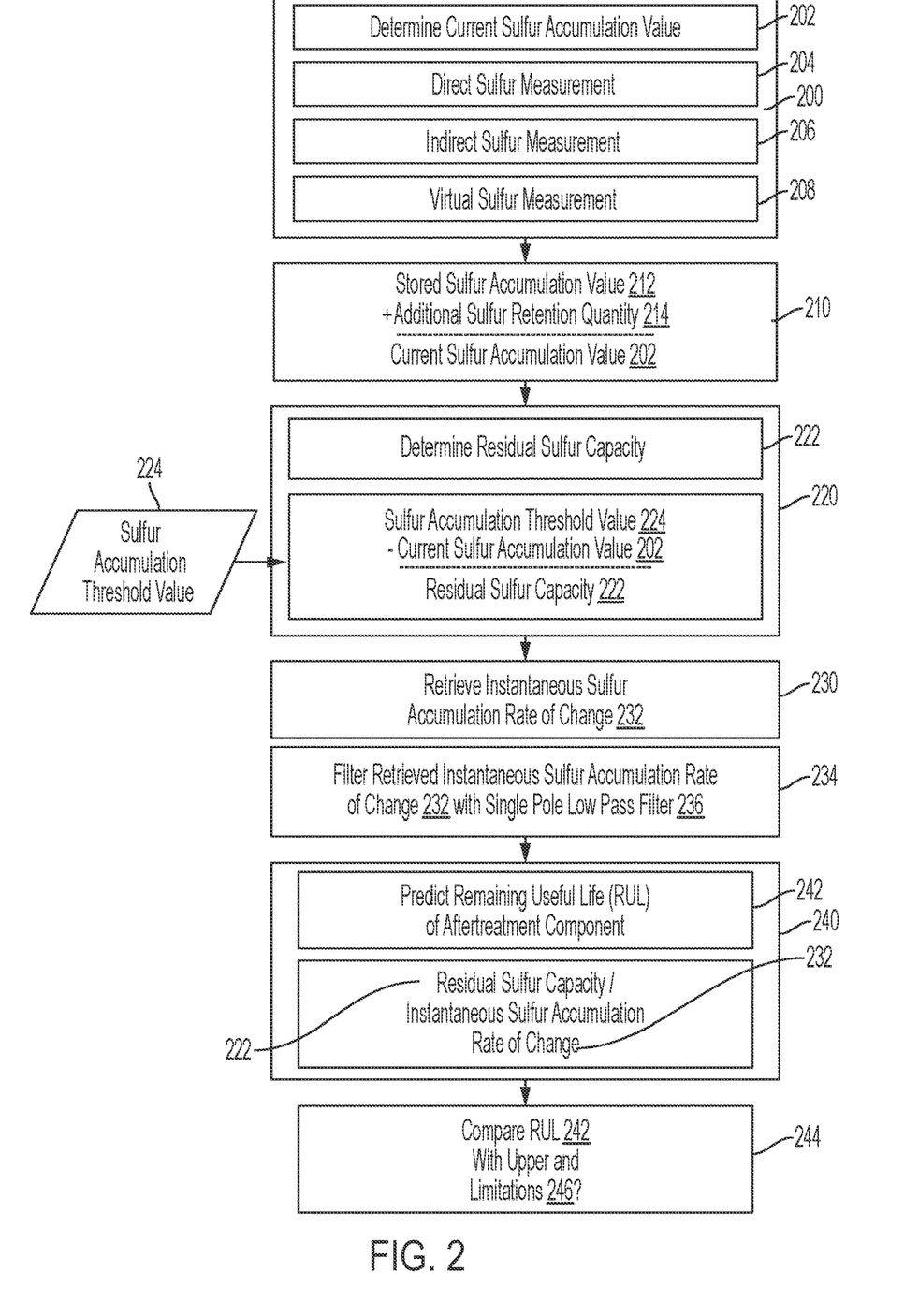
FIG. 2 is a flow diagram of a possible computer implemented process for assessing the present sulfur accumulation of the SCR catalyst and for determining a remaining useful time (RUL) value until desulfation of the catalyst should be conducted.

In a determination step 200, the process may determine the Current Sulfur Accumulation Value 202 of sulfur containing compounds in the aftertreatment component. As stated above, the determination of the amount or quantity of sulfur-containing compounds in the aftertreatment component, e.g., an SCR catalyst 146, can be conducted in any suitable manner. For example, the Current Sulfur Accumulation Value 202 may be determined by directly measuring the difference in the sulfur composition of the exhaust gasses flowing into the SCR catalyst 146 and flowing out of the SCR catalyst, the difference being the quantity of sulfur retained in the SCR catalyst. This may be referred to the direct sulfur measurement 204 and can be conducted using sulfur constituent measurements from the catalyst-in sensor 172 and the catalyst-out sensor 174.

The Current Sulfur Accumulation Value 202 may be calculated indirectly by measuring the change in value of a parameter associated with another chemical constituent of the exhaust gasses, for example, $NO_x$ or $O_2$. For example, the effectiveness of the aftertreatment component, e.g., the SCR catalyst 146, in converting and reducing NOX in the exhaust gasses can be measured by use of the catalyst-in and catalyst-out sensors 172, 174, 182. The effectiveness of the SCR catalyst 146 can be correlated to the amount or quantity of sulfur-containing compounds retained therein and the Current Sulfur Accumulation Value 202 can be estimated. This may be referred to as the indirect sulfur measurement 206.

The Current Sulfur Accumulation Value 202 may be estimated virtually using a virtual sensor and an model-driven estimate using one or more measured parameters associated with operation of the internal combustion engine, the combustion of fuel and air therein, and/or the physical and chemical characteristics of the fuel and/or air. This may be referred to as the virtual sulfur measurement 208.

Because the Current Sulfur Accumulation Value 202 changes over operational time, the Current Sulfur Accumulation Value 202 is a time dependent variable and must be periodically or continually updated by a summation or updating step 210. For example, the Current Sulfur Accumulation Value 202 at a particular instant may be stored in the computer readable memory 164 of the electronic controller 160 and becomes the Stored Sulfur Accumulation Value 212 associated with the past instances. The quantity of sulfur-containing compounds retained in the aftertreatment component, e.g., the SCR catalyst 146 since the prior instance can be determined using any of the above methods. This value may be referred to as the Additional Sulfur Retention Quantity 214 and is added to the Stored Sulfur Accumulation Value 212 by the updating step 210 to provide the Current Sulfur Accumulation Value 202. In an embodiment, the updating step 210 can be conducted repetitively or continuously in conjunction with each processing loop associated with the electronic controller 160.

In another determination step 220, the Residual Sulfur Capacity 222 of the aftertreatment component, e.g., the SCR catalyst 146, can be determined. The Residual Sulfur Capacity 222 represents the remaining capacity of the SCR catalyst 146 to retain further quantities or amounts of sulfur-containing compounds and is a function of the size and design of the SCR catalyst 146. To determine the Residual Sulfur Capacity 222, the Sulfur Accumulation Threshold Value 224 can be retrieved from, for example, the computer readable memory 164 of the electronic controller 160. The Sulfur Accumulation Threshold Value 224 may be dependent upon the size and construction of the SCR catalyst 146 and may be a design factor of the catalyst. The Sulfur Accumulation Threshold Value 224 may be a fixed value or may be temperature dependent because the temperature of the SCR catalytic substrate 148 may affect the quantity of sulfur-containing compounds that the SCR catalyst 146 can retain. The determination step 220 subtracts the Current Sulfur Accumulation Value 202 from the Sulfur Accumulation Threshold Value 224 and the difference is the Residual Sulfur Capacity 222.

In another determination step 230, the Instantaneous Sulfur Accumulation Rate of Change 232 may be determined and may represent the present rate at which sulfur containing compounds may bind to the catalytic materials on the surfaces of the catalytic substrate 148. The Instantaneous Sulfur Accumulation Rate of Change 232 is a variable that may depend on several other factors and variables. Variables may include the quantity or level of sulfur containing compounds in the exhaust gasses, the temperature of the SCR catalyst 146, the temperature of the exhaust gasses, the flowrate of the exhaust gasses, and other. The electronic controller 160 obtain measurements of the variables above using, for example, the engine-out sensor 176, the catalyst-in sensor 172, the catalyst-out sensor 174, the exhaust temperature/flowrate sensor 178, the catalyst temperature sensor 179, and other sensors from the communications network 170.

The electronic controller 160 may be programmed with one or more lookup tables or data maps that correlate or reference the measured variables with values that may be directly or indirectly used to determine the Instantaneous Sulfur Accumulation Rate of Change 232. For example, using the look up tables or data maps, the electronic controller 160 may look up a sulfur adsorption rate of the SCR catalyst 146 based on operating temperature of the SCR catalyst using the catalyst temperature sensor 179 and may look up a sulfur desorption rate based on catalyst temperature and sulfur loading. The sulfur adsorption and sulfur desorption rates can be summed to calculate the Instantaneous Sulfur Accumulation Rate of Change 232. Alternatively, the lookup tables or data maps may directly represent values for the Sulfur Accumulation Rate of Change 232. The lookup tables and data maps may be determined empirically and may be dependent upon the size, construction, and materials of the SCR catalyst 146. The lookup tables and/or data maps may be electronically stored in the computer readable memory associated with the electronic controller 160. In the determination step 230, the electronic controller accesses the appropriate lookup table or data map and determines the corresponding value for the Instantaneous Sulfur Accumulation Rate of Change 232 under the present or instantaneous operating conditions of the internal combustion engine 102 and the aftertreatment system 140.

In an embodiment, a filtering step 234 may be used to filter the values of the Instantaneous Sulfur Accumulation Rate of Change 232. For example, because the Instantaneous Sulfur Accumulation Rate of Change 232 may be dependent upon several variable that change rapidly and constantly with the changes in the operation of the internal combustion engine 102, the Instantaneous Sulfur Accumulation Rate of Change 232 may likewise fluctuate. Moreover, if the Instantaneous Sulfur Accumulation Rate of Change 232 is retrieved from the lookup tables or data maps every processing loop associated with the electronic controller 160, any single value that is retrieved may be a statistical outlier and may represent signal noise. Accordingly, the filtering step 234 is applied to filter the retrieved values for the Instantaneous Sulfur Accumulation Rate of Change 232.

The filtering step 234 can be conducted by directing each retrieved value for the Instantaneous Sulfur Accumulation Rate of Change 232 through a single pole low pass filter 236. The single pole low pass filter 236 cuts off or eliminates the retrieved values or readings that are outside a predetermined range, i.e. the cutoff point or threshold, and thereby reduces or eliminates noise associated with the retrieved values of the Instantaneous Sulfur Accumulation Rate of Change 232. The single pole low pass filter 236 may be a software-implemented filter associated with the electronic controller 160 via software. In other embodiments, the filtering step 234 can be performed by other mathematical averaging operations such as by calculating a moving average of the Instantaneous Sulfur Accumulation Rate of Change 232.

Once the Instantaneous Sulfur Accumulation Rate of Change 232 is determined, the electronic controller 160 may conduct a prediction step 240 in which the Remaining Useful Life (RUL) 242 is predicated or estimated using the Remaining Useful Life (RUL) algorithm. For example, the Residual Sulfur Capacity 222 from the determination step 220 is divided by the Instantaneous Sulfur Accumulation Rate of Change 232 and the resultant is the RUL 242, for example, in hours that the aftertreatment component, e.g., the SCR catalyst 146 will remain operational within functionally acceptable limitations. To communicate the RUL 242 to an operator of the power generation system 100, the electronic controller 160 can direct an appropriate electronic signal to the HMI 190, which presents the RUL prediction on the display screen 194 in appropriate units of time like hours.

In an embodiment, a limitation comparison step 244 may be included to ensure the RUL 242 is within acceptable limitations of reasonably predicated results for the RUL, thus ensuring accuracy of the RUL as predicted. For example, the RUL 242 may be compared with upper and/or lower limitations 246 or thresholds. The upper and lower limitations 246 may indicate the predicted result for the RUL is not possible or undesirable. For example if the predicted RUL is greater than the as manufactured service life, that indicates the predicted RUL cannot be correct. If the RUL 242 is outside those limitations, the electronic controller 160 may take appropriate action such as alerting an operator via the HMI 190.

Industrial Applicability

Figure 3:
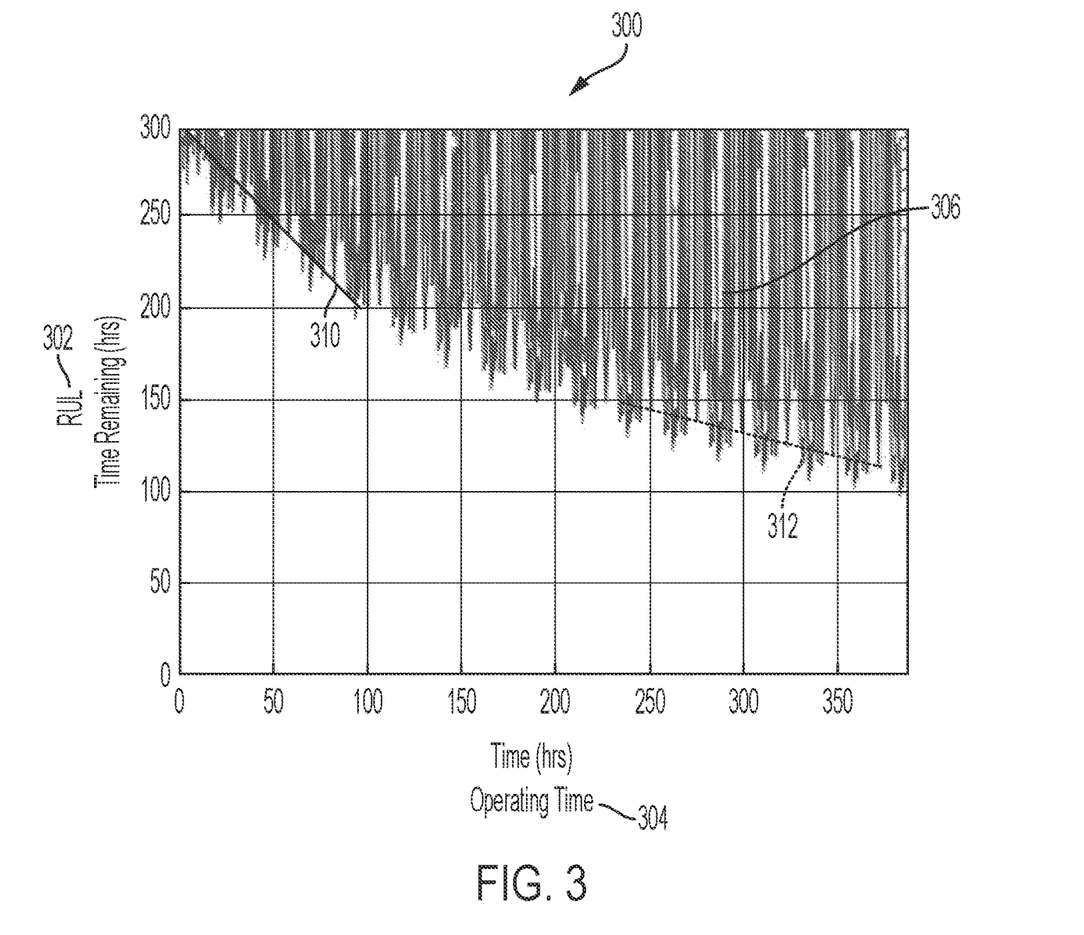
FIG. 3 is a representative graph illustrating the progressive accumulation of sulfur-containing compounds in the SCR catalyst with respect to operating time

Referring to FIG. 3, and with continued reference to FIGS. 1-2, there is graphically represented the output of the Remaining Useful Life (RUL) algorithm in accordance with the disclosure. Along the X-axis 304 of the graph 300 there is represented the operating hours associated with the aftertreatment component, e.g., the SCR catalyst 146 and the Y-axis 302 represents the Remaining Useful Life (RUL) of the aftertreatment component. Charted on the graph 300 are the individual and/or instantaneous estimations of the RUL 306 calculation, for example, using the above equation for the Instantaneous Sulfur Accumulation Rate of Change, and using data which may be obtained from lookup tables and/or data maps as described above or calculated as described above. Because the variables, e.g. exhaust temperature, exhaust flowrate, concentration of sulfur-containing compounds, used to retrieve the Instantaneous Sulfur Accumulation Rate of Change fluctuate depending upon the load of the power generation system 100, the plot of the Instantaneous Sulfur Accumulation Rate of Change and the RUL 306 calculated therefrom likewise fluctuates.

In the example where the power generation system 100 is associated with a generator, or a genset, the retrieved values for the Instantaneous Sulfur Accumulation Rate of Change fluctuate accordingly to the transient changes of the load. However, by applying the filtering step 234 describe above and directing the retrieved values for the Instantaneous Sulfur Accumulation Rate of Change through a single pole, low pass filter 236, the Remaining Useful Life (RUL) algorithm can reduce the noise associated with the changing operating conditions of the internal combustion engine 102 and the resulting plot of the Instantaneous Sulfur Accumulation Rate of Change and the RUL 306 calculated therefrom on the graph 300 can be averaged or smoothed. The filtered output may be represented by the first straight line 310 on the graph 300.

The graph 300 may also represent the gradual slowing of sulfur accumulation in the aftertreatment component over duration of operation. For example, during early stage operation of the aftertreatment component, sulfur retention may be directly proportional with the operating time so that the RUL 302 as it corresponds to the Y-axis decreases proportionally with the operating time 304 on the X-axis. However, later in the operational life of the aftertreatment component, the RUL 302 as it corresponds to the Y-axis may not decrease at a proportional rate and the RUL 302 may not drop linearly with the operating hours 304 represented by the second straight line 312. A possible advantage of applying the RUL algorithm describe above is that it accounts for this change.

In accordance with the disclosure, there is provide a computer implemented method and system by which the Remaining Useful Life (RUL) of an aftertreatment component can be predicted using a prognostic algorithm. This can provide the current operator of the power generation system an accurate prediction of the RUL before desulfation is required regardless of any historic knowledge of the use of the power generation system. These and other possible advantages and features of the disclosure will be apparent from the foregoing detailed description and the accompanying drawings.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A power generation system comprising:
an internal combustion engine including one or more combustion chambers for combusting a mixture of fuel and intake air;
an exhaust system including an exhaust conduit in fluid communication with the one or more combustion chambers to direct exhaust gasses from the internal combustion engine to an ambient environment;
an aftertreatment system operatively associated with the exhaust system and including an aftertreatment component fluidly disposed in the exhaust conduit;
a plurality of sensors measuring one or more operating characteristics associated with one or more of the internal combustion engine, the exhaust system, and aftertreatment system; and
an electronic controller in data communication with the plurality of sensors, the electronic controller programmed to execute a remaining useful life algorithm to predict a Remaining Useful Life (RUL) of the aftertreatment component that is based in part by determining an Instantaneous Sulfur Accumulation Rate of Change from the one or more operating characteristics.

2. The power generation system of claim 1, wherein the RUL is determined by dividing a Residual Sulfur Capacity by the Instantaneous Sulfur Accumulation Rate of Change.

3. The power generation system of claim 2, wherein the Residual Sulfur Capacity is calculated by subtracting a Current Sulfur Accumulation Value from a Sulfur Accumulation Threshold Value.

4. The power generation system of claim 3, wherein the Current Sulfur Accumulation Value is calculated by repetitively summing a Stored Sulfur Accumulation Value associated with the aftertreatment component with an Additional Sulfur Retention Quantity.

5. The power generation system of claim 4, wherein the Sulfur Accumulation Threshold Value represents a total quantity of sulfur-containing particles the aftertreatment system can accumulate while operating effectively.

6. The power generation system of claim 1, wherein the Instantaneous Sulfur Accumulation Rate of Change is retrieved from a lookup table or data map using the one or more operating characteristics.

7. The power generation system of claim 6, wherein the Instantaneous Sulfur Accumulation Rate of Change as retrieved is filtered to reduce signal noise.

8. The power generation system of claim 7, wherein filtering of the Instantaneous Sulfur Accumulation Rate of Change as retrieved is done with a single pole low pass filter.

9. The power generation system of claim 6, wherein the one or more operating characteristics is selected from the group comprising concentration level of sulfur-containing compounds in the exhaust gasses; temperature of the exhaust gasses, flowrate of the exhaust gasses, and temperature of the aftertreatment component.

10. The power generation system of claim 1, wherein the RUL as predicted is compared to upper and lower limitations to ensure accuracy of the RUL as predicted.

11. The power generation system of claim 1, wherein the remaining useful life algorithm is:

$$\text{Remaining Useful Life } (RUL) = $$
$$[\text{Sulfur Accumulation Threshold Value } - $$
$$\text{Current Sulfur Accumulation Value } (t)] \div$$
$$[\text{Instantaneous Sulfur Accumulation Rate of Change}].$$

12. The power generation system of claim 1, wherein the aftertreatment component is a selective catalytic reduction (SCR) catalyst for conversion of $NO_x$ in the exhaust gasses.

13. A method of monitoring performance of an aftertreatment component associated with an exhaust system and receiving exhaust gasses from an internal combustion engine, the method comprising:
   determining a Current Sulfur Accumulation Value of sulfur-containing compounds in the aftertreatment component;
   subtracting the Current Sulfur Accumulation Value from a Sulfur Accumulation Threshold Value associated with the aftertreatment component to calculate a Residual Sulfur Capacity of the aftertreatment component; and
   dividing the Residual Sulfur Capacity by an Instantaneous Sulfur Accumulation Rate of Change representing the present rate that sulfur-containing compounds are retained in the aftertreatment component.

14. The method of claim 13, wherein the Instantaneous Sulfur Accumulation Rate of Change is retrieved from a one of a lookup table or data map.

15. The method of claim 14, wherein the Instantaneous Sulfur Accumulation Rate of Change is retrieved using one or more operating characteristics associated with one or more of the internal combustion engine, the exhaust system, and aftertreatment system.

16. The method of claim 13, wherein the Current Sulfur Accumulation Value is determined by directly measuring a quantity of sulfur-containing compounds retrained in the aftertreatment system.

17. The method of claim 13, wherein the Current Sulfur Accumulation Value is determined by indirectly measuring change in a parameter associated with another constituent of the exhaust gasses.

18. The method of claim 13, wherein the Current Sulfur Accumulation Value is determined virtually using a virtual sensor measuring parameters associated with one or more of the internal combustion engine, the exhaust system, and aftertreatment system.

19. A computer readable medium having programming instructions for monitoring performance of an aftertreatment component by:
   determining a Current Sulfur Accumulation Value representing a current quantity of sulfur-containing compounds accumulated in the aftertreatment component;
   calculating a Residual Sulfur Capacity of the aftertreatment component by subtracting the Current Sulfur Accumulation Value from a Sulfur Accumulation Threshold Value associated with the aftertreatment component; and
   predicting a Remaining Useful Life (RUL) of the after treatment component by dividing the Residual Sulfur Capacity by an Instantaneous Sulfur Accumulation Rate of Change representing a present rate at which sulfur-containing compounds are accumulating in the aftertreatment component.

20. The computer readable medium of claim 19, wherein the RUL of the aftertreatment component is calculated by a remaining useful life algorithm:

$$\text{Remaining Useful Life } (RUL) = $$
$$[\text{Sulfur Accumulation Threshold Value } - $$
$$\text{Current Sulfur Accumulation Value } (t)] \div$$
$$[\text{Instantaneous Sulfur Accumulation Rate of Change}].$$

* * * * *